(12) United States Patent
Chen

(10) Patent No.: US 11,086,414 B2
(45) Date of Patent: Aug. 10, 2021

(54) MOUSE DEVICE

(71) Applicant: Chicony Electronics Co., Ltd., New Taipei (TW)

(72) Inventor: Huai-Chih Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 17 days.

(21) Appl. No.: 16/679,267

(22) Filed: Nov. 10, 2019

(65) Prior Publication Data

US 2020/0341565 A1 Oct. 29, 2020

(30) Foreign Application Priority Data

Apr. 23, 2019 (TW) .................................. 108114191

(51) Int. Cl.
*G06F 3/0354* (2013.01)
*G06F 3/03* (2006.01)

(52) U.S. Cl.
CPC ........ *G06F 3/03543* (2013.01); *G06F 3/0304* (2013.01); *G06F 3/03547* (2013.01)

(58) Field of Classification Search
CPC .......................... G06F 3/03543; G06F 3/03541
See application file for complete search history.

(56) References Cited

U.S. PATENT DOCUMENTS

| | | | | |
|---|---|---|---|---|
| 2005/0116933 | A1* | 6/2005 | Huang | G06F 3/03545 345/163 |
| 2010/0053084 | A1* | 3/2010 | Chatterjee | G06F 3/03543 345/163 |
| 2012/0086641 | A1* | 4/2012 | Chien | G06F 3/04886 345/166 |
| 2013/0021247 | A1 | 1/2013 | Pu | |

FOREIGN PATENT DOCUMENTS

| | | |
|---|---|---|
| TW | M40442525 U | 5/2011 |
| TW | M448021 U | 3/2013 |
| TW | I495417 B | 8/2015 |

\* cited by examiner

*Primary Examiner* — Kent W Chang
*Assistant Examiner* — Chayce R Bibbee
(74) *Attorney, Agent, or Firm* — CKC & Partners Co., LLC

(57) ABSTRACT

A mouse device includes a first main body, a second main body, a flexible connecting member, and a fixing member. The first main body has a first bottom surface. The second main body has a second bottom surface and a first fixing hole. The flexible connecting member is connected between the first main body and the second main body. The fixing member is disposed on the first main body and includes a fixing block. The fixing block is configured to be detachably engaged with the first fixing hole.

11 Claims, 10 Drawing Sheets

MOUSE DEVICE

CROSS-REFERENCE TO RELATED APPLICATION

This application claims priority to Taiwan Application Serial Number 108114191, filed Apr. 23, 2019, which is herein incorporated by reference.

BACKGROUND

Technical Field

The present disclosure relates to a mouse device.

Description of Related Art

As important external input devices of computers, mouse devices allow users to move cursors on computer screens quickly by moving the mouse devices and allow the users to perform quick input operations such as confirmation, cancellation, and the like by the operation of the mouse devices. Therefore, the mouse devices greatly improve convenience for the users to operate the computers.

However, a mouse device has a certain size and is usually used in conjunction with a portable computer. When using a portable bag to carry the mouse device along with the portable computer, it often feels that the mouse device occupies too much space in the portable bag and is inconvenient to carry. Furthermore, after several changes in the use of the portable computer, it is easy to forget the mouse device. In addition, for the convenience of carrying, some conventional mouse devices are designed to be small in volume, but this often affects the user's operating experience.

Accordingly, how to provide a mouse device to solve the aforementioned problems becomes an important issue to be solved by those in the industry.

SUMMARY

An aspect of the disclosure is to provide a mouse device that can efficiently solve the aforementioned problems.

According to an embodiment of the disclosure, a mouse device includes a first main body, a second main body, a flexible connecting member, and a fixing member. The first main body has a first bottom surface. The second main body has a second bottom surface and a first fixing hole. The flexible connecting member is connected between the first main body and the second main body. The fixing member is disposed on the first main body and includes a fixing block. The fixing block is configured to be detachably engaged with the first fixing hole.

In an embodiment of the disclosure, when the fixing block is engaged with the first fixing hole, the second bottom surface and the first bottom surface are substantially parallel to each other.

In an embodiment of the disclosure, the second main body further has a second fixing hole. The fixing block is further configured to be detachably engaged with the second fixing hole. When the fixing block is engaged with the second fixing hole, the second bottom surface is inclined at an angle relative to the first bottom surface.

In an embodiment of the disclosure, the second main body further has a third fixing hole. The fixing block is further configured to be detachably engaged with the third fixing hole. When the fixing block is engaged with the third fixing hole, the second bottom surface is inclined at the angle relative to the first bottom surface.

In an embodiment of the disclosure, shortest distances respectively measured from the second fixing hole and the third fixing hole to the second bottom surface are different.

In an embodiment of the disclosure, the second main body further has a third bottom surface. When the fixing block is engaged with the second fixing hole, the third bottom surface and the first bottom surface are substantially parallel to each other.

In an embodiment of the disclosure, the second main body has a first height based on the second bottom surface and a second height based on the third bottom surface. The first height is smaller than the second height.

In an embodiment of the disclosure, the first main body has a receiving groove configured to receive the fixing member.

In an embodiment of the disclosure, the fixing member is pivotally connected to a sidewall of the receiving groove.

In an embodiment of the disclosure, the fixing member is slidably connected to a sidewall of the receiving groove.

In an embodiment of the disclosure, the flexible connecting member includes a first connecting portion, a second connecting portion, and a third connecting portion. The first connecting portion is connected to the first main body. The second connecting portion is connected to the second main body. The third connecting portion is connected between the first connecting portion and the second connecting portion and has a receiving through hole.

In an embodiment of the disclosure, the mouse device further includes a first magnetic attracting member and a second magnetic attracting member. The first magnetic attracting member is disposed on the first main body. The second magnetic attracting member is disposed on the second main body and configured to attract the first magnetic attracting member.

Accordingly, in the mouse device of the present disclosure, the two main bodies are connected through the flexible connecting member, so that the two main bodies can be folded close to each other by bending the flexible connecting member. Moreover, the two main bodies are respectively provided with the magnetic attracting members that can attract each other, thereby fixing the relative positions of the two main bodies. In other usage scenarios, the mouse device of the present disclosure can be used to attach the two main bodies to the front and back sides of an external electronic device (e.g., the external electronic device is designed with ferromagnetic materials or magnetic attracting members thereon), thereby improving the portability of the mouse device. In addition, in the mouse device of the present disclosure, the fixing member disposed on one of the main bodies can be selectively fixed to different fixing holes on the other of the main bodies, so that the two main bodies form different operating states and can be selected by different users according to their own operating experience.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
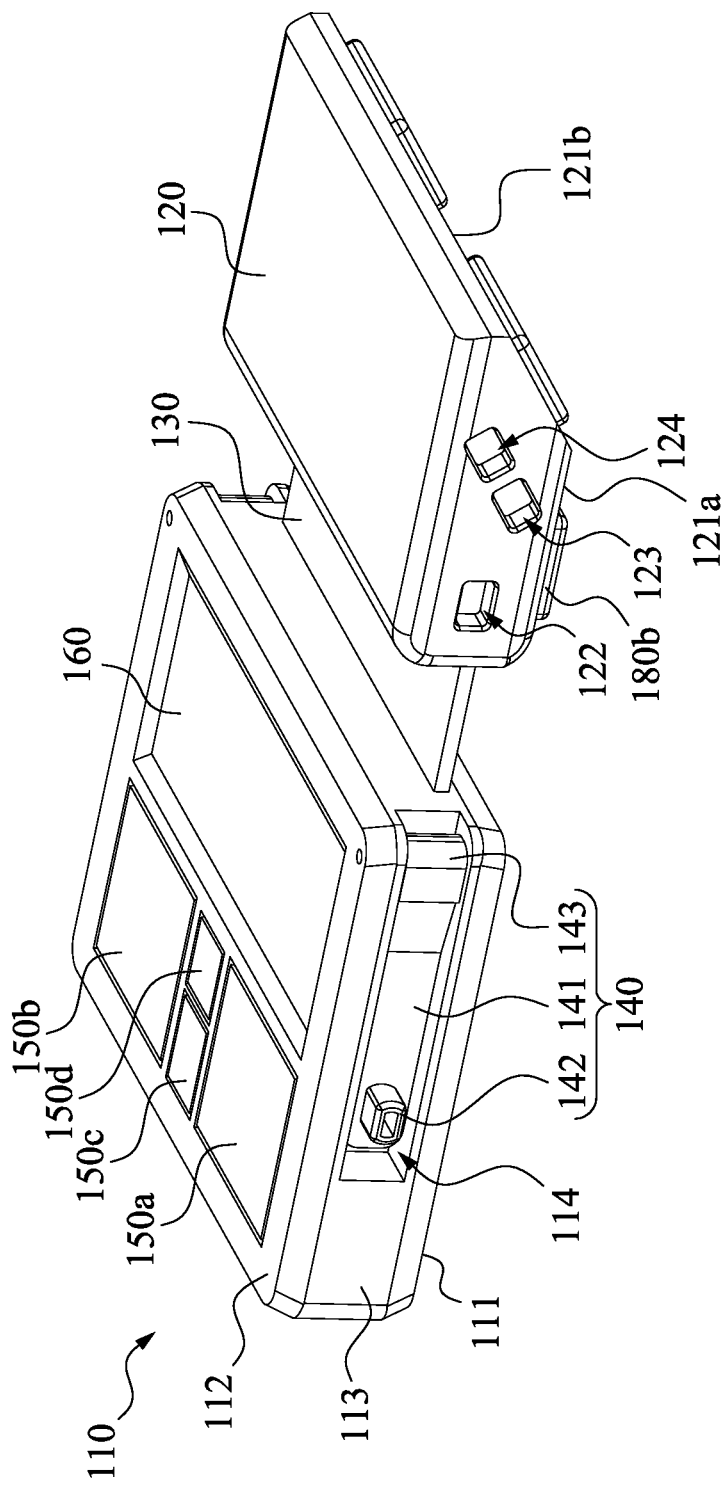
FIG. 1 is a perspective view of a mouse device according to an embodiment of the disclosure, in which a fixing member is folded to a first main body.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
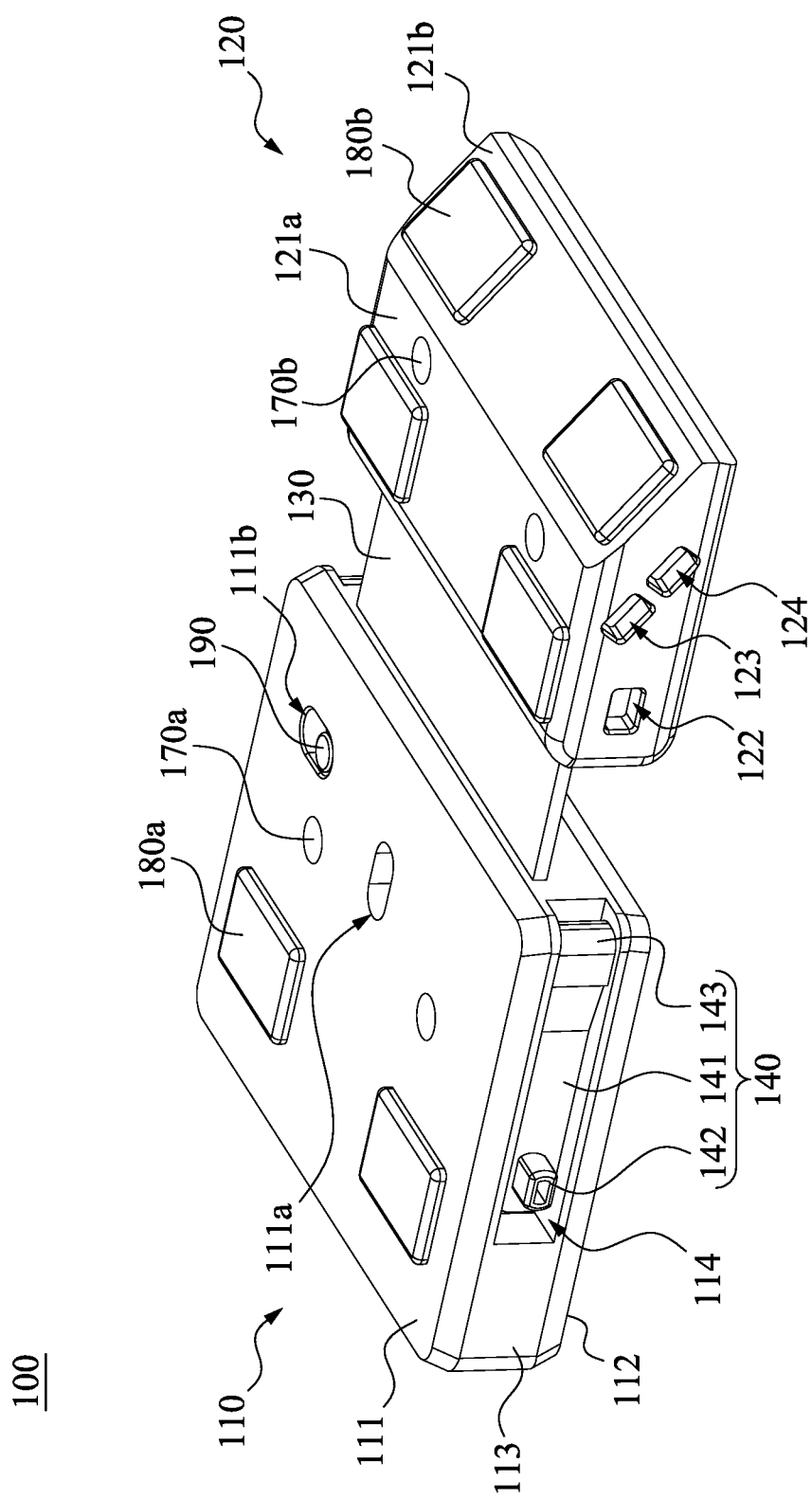
FIG. 2 is another perspective view of the mouse device shown in FIG. 1.

Reference is made to FIGS. 1 and 2. FIG. 1 is a perspective view of a mouse device 100 according to an embodiment of the disclosure, in which a fixing member 140 is folded to a first main body 110. FIG. 2 is another perspective view of the mouse device 100 shown in FIG. 1. In the present embodiment, the mouse device 100 includes the first main body 110, a second main body 120, and a flexible connecting member 130. The flexible connecting member 130 is connected between the first main body 110 and the second main body 120. With the structural configuration, the first main body 110 and the second main body 120 can be folded close to each other by bending the flexible connecting member 130.

In some embodiments, the flexible connecting member 130 includes a knitted fabric layer, a leather layer, or the like, but the disclosure is not limited in this regard.

As shown in FIGS. 1 and 2, in the present embodiment, the first main body 110 has a first bottom surface 111 and a first top surface 112 respectively at opposite sides. The mouse device 100 further includes a circuit board (not shown), a plurality of buttons 150a, 150b, 150c, 150d, and a touchpad 160. The circuit board is disposed inside the first main body 110. The buttons 150a, 150b, 150c, 150d and the touchpad 160 are disposed on the first main body 110 and expose out from the first top surface 112. By pressing buttons 150a, 150b to trigger corresponding keyswitch circuits on the circuit board, corresponding keyswitch signals can be used as a left keyswitch signal and a right keyswitch signal of the mouse device 100 respectively. The buttons 150c, 150d are located between the buttons 150a, 150b and arranged in a front-rear direction. By pressing buttons 150c, 150d to trigger corresponding keyswitch circuits on the circuit board, corresponding keyswitch signals can be used as a forward rolling input signal and a backward rolling input signal of the mouse device 100 respectively.

The touchpad 160 is electrically connected to the circuit board. By sliding a finger on the touchpad 160, a corresponding touch signal can be used as a displacement control signal of the cursor in the computer program for use with the mouse device 100. Therefore, a user can control the movement of the cursor only by touching the touchpad 160 without actually moving the mouse device 100.

As shown in FIG. 2, in the present embodiment, the mouse device 100 further includes a displacement sensor (not shown) and a power switch 190. The first bottom surface 111 of the first main body 110 has a first through hole 111a and a second through hole 111b. The displacement sensor is disposed inside the first main body 110, electrically connected to the circuit board, and configured to sense a displacement of the first main body 110 relative to an object (e.g., a desktop) via the first through hole 111a. By moving the mouse device 100 relative to the object, a displacement signal corresponding to the displacement sensor can also be used as a displacement control signal for the cursor in the computer program for use with the mouse device 100. In an embodiment, the displacement sensor is an optical sensor, but the disclosure is not limited in this regard. The power switch 190 is exposed by the second through hole 111b and is selectively slidable by the user to turn on or off the power of the mouse device 100. In some embodiments, the mouse device 100 can also cancel one of the touchpad 160 and the displacement sensor.

As shown in FIGS. 1 and 2, in the present embodiment, the mouse device 100 further includes a plurality of foot pads 180a, 180b. The foot pads 180a, 180b are respectively disposed on the first main body 110 and the second main body 120, thereby serving as a medium for contacting an object (e.g., a desktop) when the mouse device 100 is placed on the object. In the embodiment where the mouse device 100 generates the displacement control signal by the touchpad 160, the foot pads 180a, 180b may be selected from a material having a high coefficient of friction (e.g., silicone). In the embodiment where the mouse device 100 generates the displacement control signal by the displacement sensor, the foot pads 180a, 180b may be selected from a material having a lower coefficient of friction (e.g., Teflon).

In some embodiments, the mouse device 100 further includes a power module (not shown) and a flexible circuit board (not shown). The power module is located in the second main body 120. The flexible circuit board is embedded in the flexible connecting member 130 and extends into the first main body 110 and the second main body 120 to be electrically connected to the circuit board and the power module. Therefore, the power module can supply power to the circuit board through the flexible circuit board.

Figure 3A:
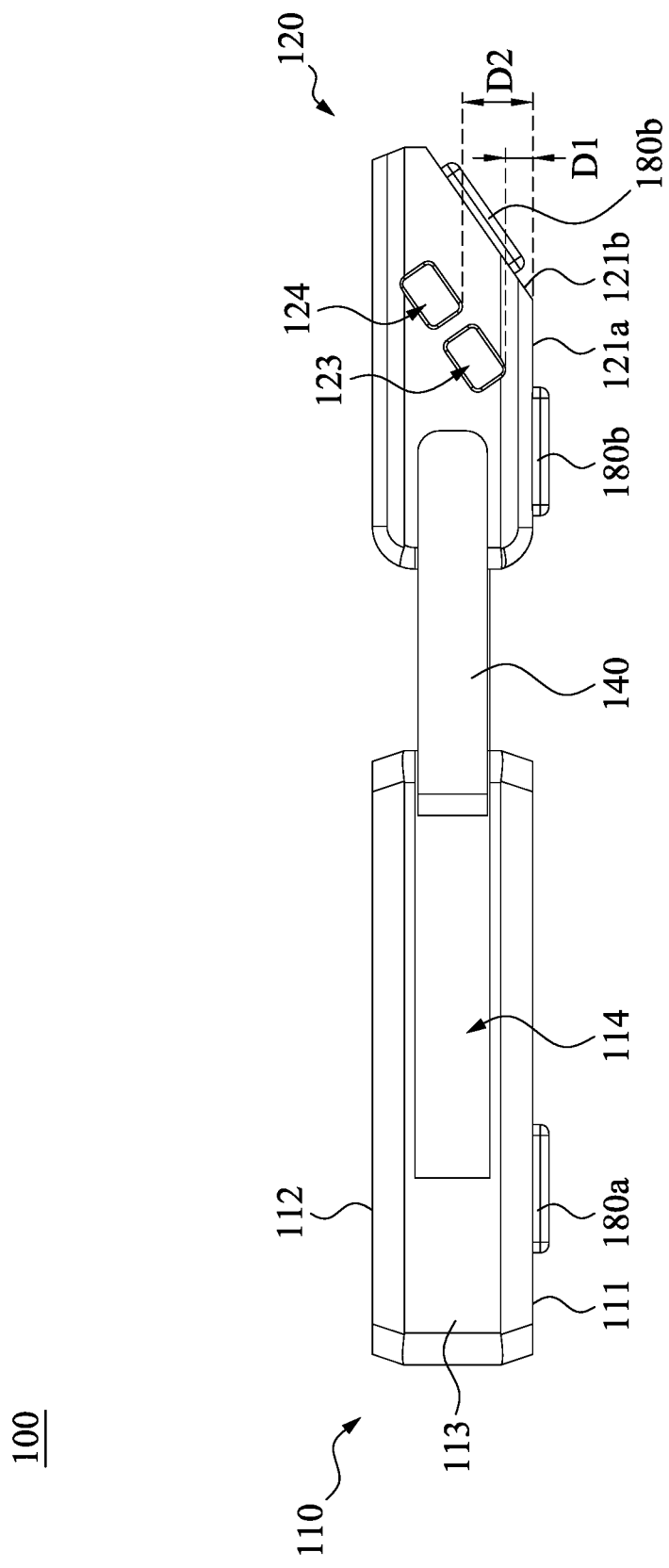
FIG. 3A is a side view of the mouse device shown in FIG. 1, in which the fixing member is fixed to a second main body to make the mouse device in a first operating state.

Reference is made to FIG. 3A. FIG. 3A is a side view of the mouse device 100 shown in FIG. 1, in which the fixing member 140 is fixed to the second main body 120 to make the mouse device 100 in a first operating state. As shown in FIGS. 1 and 3A, in the present embodiment, the second main body 120 has a first fixing hole 122, a second fixing hole 123, and a third fixing hole 124. The mouse device 100 includes the fixing member 140. The fixing member 140 is disposed on the first main body 110 and includes an arm portion 141, a fixing block 142, and a pivotal shaft 143. Specifically, the first main body 110 further has a receiving groove 114 located at a side surface 113. The receiving groove 114 is configured to receive the fixing member 140. The fixing block 142 and the pivotal shaft 143 are respectively adjacent to two ends of the arm portion 141. The fixing member 140 is pivotally connected to a sidewall of the receiving groove 114 through the pivotal shaft 143. Therefore, the fixing member 140 can be selectively received in the receiving groove 114 (as shown in FIG. 1) or expanded to extend outward (as shown in FIG. 3A) by rotating. The fixing block 142 is configured to be detachably engaged with one of the first fixing hole 122, the second fixing hole 123, and the third fixing hole 124.

As shown in FIG. 3A, the second main body 120 has a second bottom surface 121a. When the fixing block 142 is engaged with the first fixing hole 122, the second bottom surface 121a of the second main body 120 and the first bottom surface 111 of the first main body 110 are substantially parallel to each other, which is the first operating state presented by the mouse device 100.

Figure 3B:
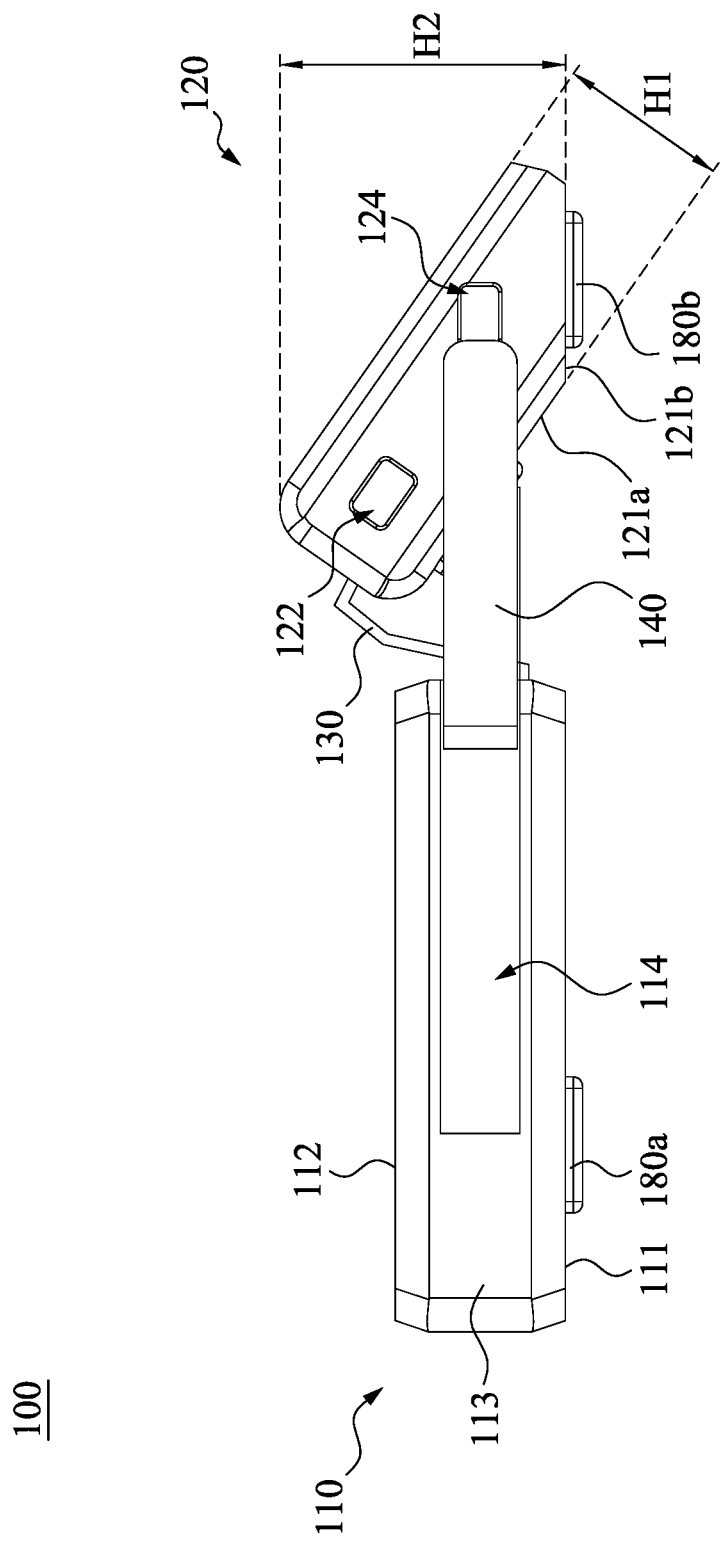
FIG. 3B is another side view of the mouse device shown in FIG. 1, in which the fixing member is fixed to the second main body to make the mouse device in a second operating state.

Reference is made to FIG. 3B. FIG. 3B is another side view of the mouse device 100 shown in FIG. 1, in which the fixing member 140 is fixed to the second main body 120 to make the mouse device 100 in a second operating state. As shown in FIGS. 1 and 3B, in the present embodiment, the second main body 120 further has a third bottom surface 121b. The second bottom surface 121a and the third bottom surface 121b are connected and not parallel. When the fixing block 142 is engaged with the second fixing hole 123, the second bottom surface 121a of the second main body 120 is inclined at an angle relative to the first bottom surface 111 of the first main body 110, and the third bottom surface 121b of the second main body 120 and the first bottom surface 111 of the first main body 110 are substantially parallel to each other. In addition, the second main body 120 has a first height H1 based on the second bottom surface 121a and a second height H2 based on the third bottom surface 121b. The first height H1 is smaller than the second height H2. With the foregoing structural configurations, the mouse device 100 can be configured into different operating states corresponding to the fixing block 142 engaged with the first fixing hole 122 or the second fixing hole 123, and users can choose according to their own preferred operating experience. For example, If a user wants the mouse device 100 to move more smoothly on an object, the first operating state in which the second main body 120 is not arched relative to the first main body 110 as shown in FIG. 3A may be employed; and if the user wants the palm to obtain a more supporting feeling, the second operating state in which the second main body 120 is arched relative to the first main body 110 as shown in FIG. 3B may be employed.

Figure 3C:
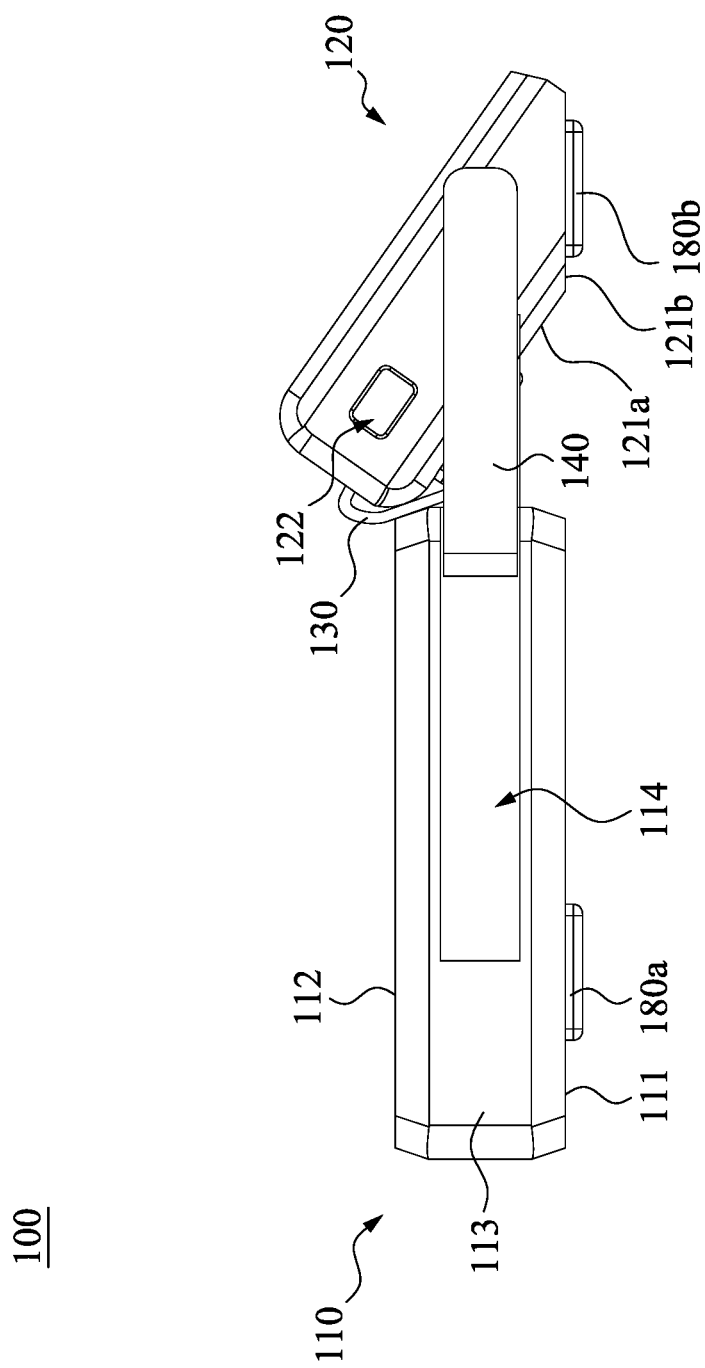
FIG. 3C is another side view of the mouse device shown in FIG. 1, in which the fixing member is fixed to the second main body to make the mouse device in a third operating state.

Reference is made to FIG. 3C. FIG. 3C is another side view of the mouse device 100 shown in FIG. 1, in which the fixing member 140 is fixed to the second main body 120 to make the mouse device 100 in a third operating state. As shown in FIGS. 1 and 3C, in the present embodiment, when the fixing block 142 is engaged with the third fixing hole 124, the second bottom surface 121a of the second main body 120 is inclined at the foregoing angle relative to the first bottom surface 111 of the first main body 110, and the third bottom surface 121b of the second main body 120 and the first bottom surface 111 of the first main body 110 are still substantially parallel to each other. It is noted that as shown in FIG. 3A, shortest distances D1, D2 respectively measured from the second fixing hole 123 and the third fixing hole 124 to the second bottom surface 121a of the second main body 120 are different. With the foregoing structural configurations, the mouse device 100 can be configured into different operating states corresponding to the fixing block 142 engaged with the second fixing hole 123 or the third fixing hole 124. For example, if the palm of a user is larger, the second operating state in which the second main body 120 is away from the first main body 110 as shown in FIG. 3B may be employed; and if the palm of a user is smaller, the third operating state in which the second main body 120 is close to the first main body 110 as shown in FIG. 3C may be employed.

In some embodiments, in order to maintain the aforementioned operating state of the mouse device 100, the external shape of the fixing block 142 can be designed as a square column, and the shapes of the first fixing hole 122, the second fixing hole 123, and the third fixing hole 124 can be designed as square holes correspondingly, but the disclosure is not limited in this regard and the shapes can be flexibly adjusted according to actual needs.

In some embodiments, in order to firmly fix the second main body 120, the two fixing members 140 can be respectively disposed on opposite sides of the first main body 110, and two groups of the first fixing holes 122, the second fixing holes 123, and the third fixing holes 124 can be respectively disposed on opposite sides of the second main body 120.

Figure 4:
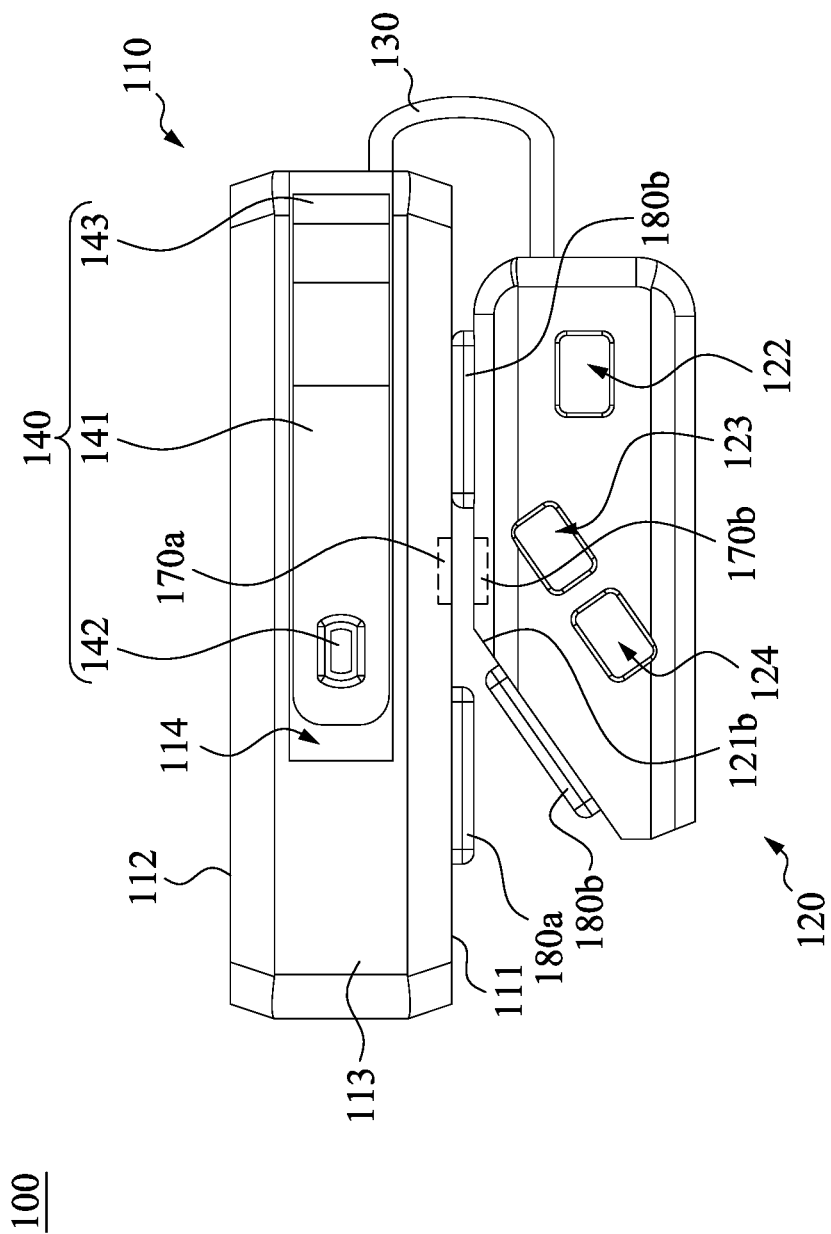
FIG. 4 is a side view of the mouse device shown in FIG. 1 in a receiving state.

As shown in FIG. 2, in the present embodiment, the mouse device 100 further includes a plurality of first magnetic attracting members 170a and a plurality of second magnetic attracting members 170b. The first magnetic attracting members 170a are disposed on the first main body 110 and located on the first bottom surface 111. The second magnetic attracting members 170b are disposed on the second main body 120 and located on the second bottom surface 121a. Reference is made to FIG. 4. FIG. 4 is a side view of the mouse device 100 shown in FIG. 1 in a receiving state. Under the receiving state as shown in FIG. 4, the purpose of fixing relative positions of the first main body 110 and the second main body 120 can be achieved by the first magnetic attracting members 170a and the second magnetic attracting members 170b being attracted to each other, so that the first main body 110 and the second main body 120 can be maintained in the receiving state in which they are folded together and are easily received.

Figure 5:
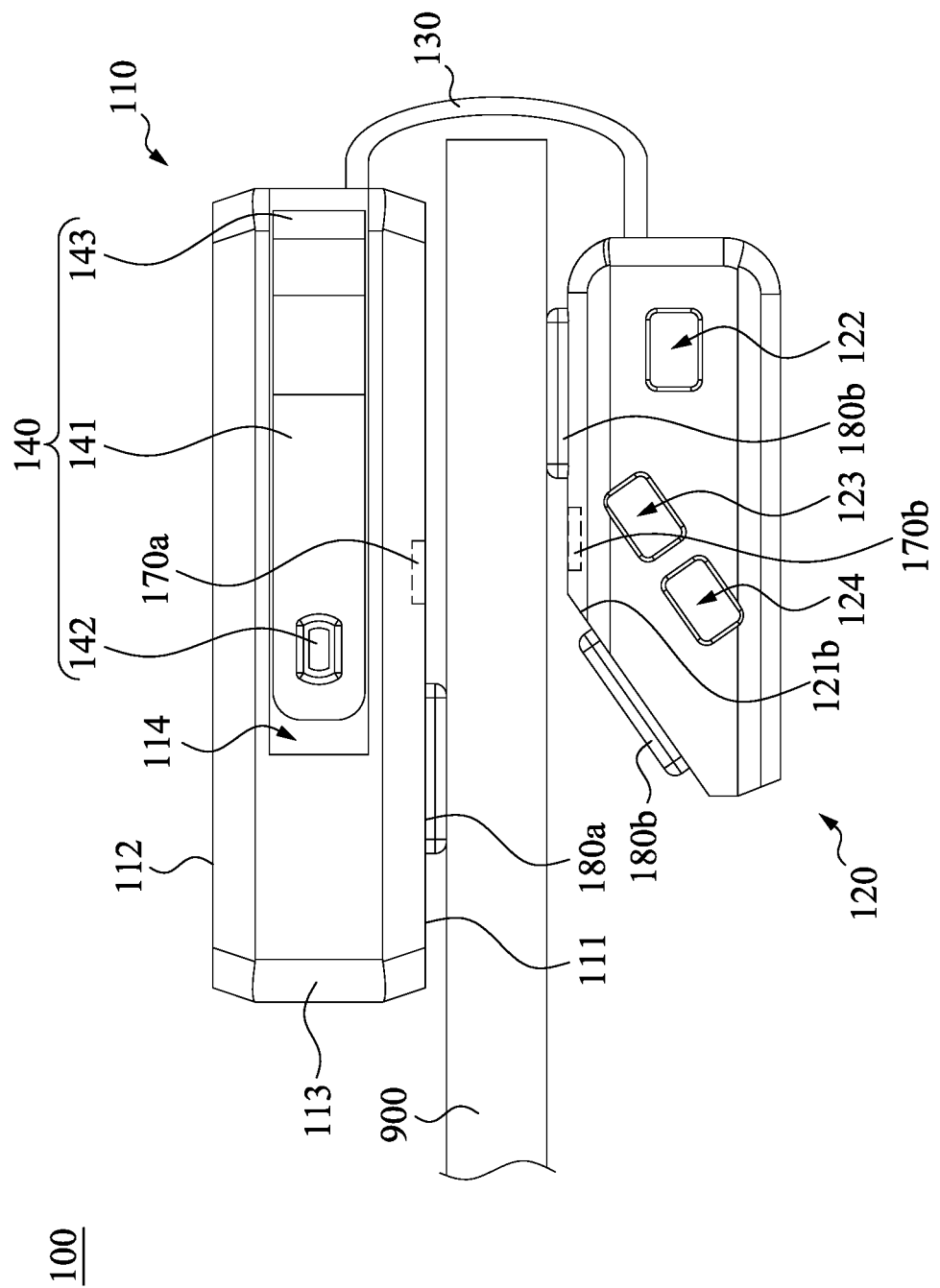
FIG. 5 is a side view of the mouse device shown in FIG. 1 in another receiving state.

Reference is made to FIG. 5. FIG. 5 is a side view of the mouse device 100 shown in FIG. 1 in another receiving state. As shown in FIG. 5, in the present embodiment, the mouse device 100 can also respectively attach the first main body 110 and the second main body 120 to the front and back sides of an external electronic device 900 by the first magnetic attracting members 170a and the second magnetic attracting members 170b (e.g., the external electronic device 900 is designed with ferromagnetic materials or magnetic attracting members thereon), thereby improving the portability of the mouse device 100. The external electronic device 900 is, for example, a notebook computer or a tablet computer, but the disclosure is not limited in this regard.

Figure 6A:
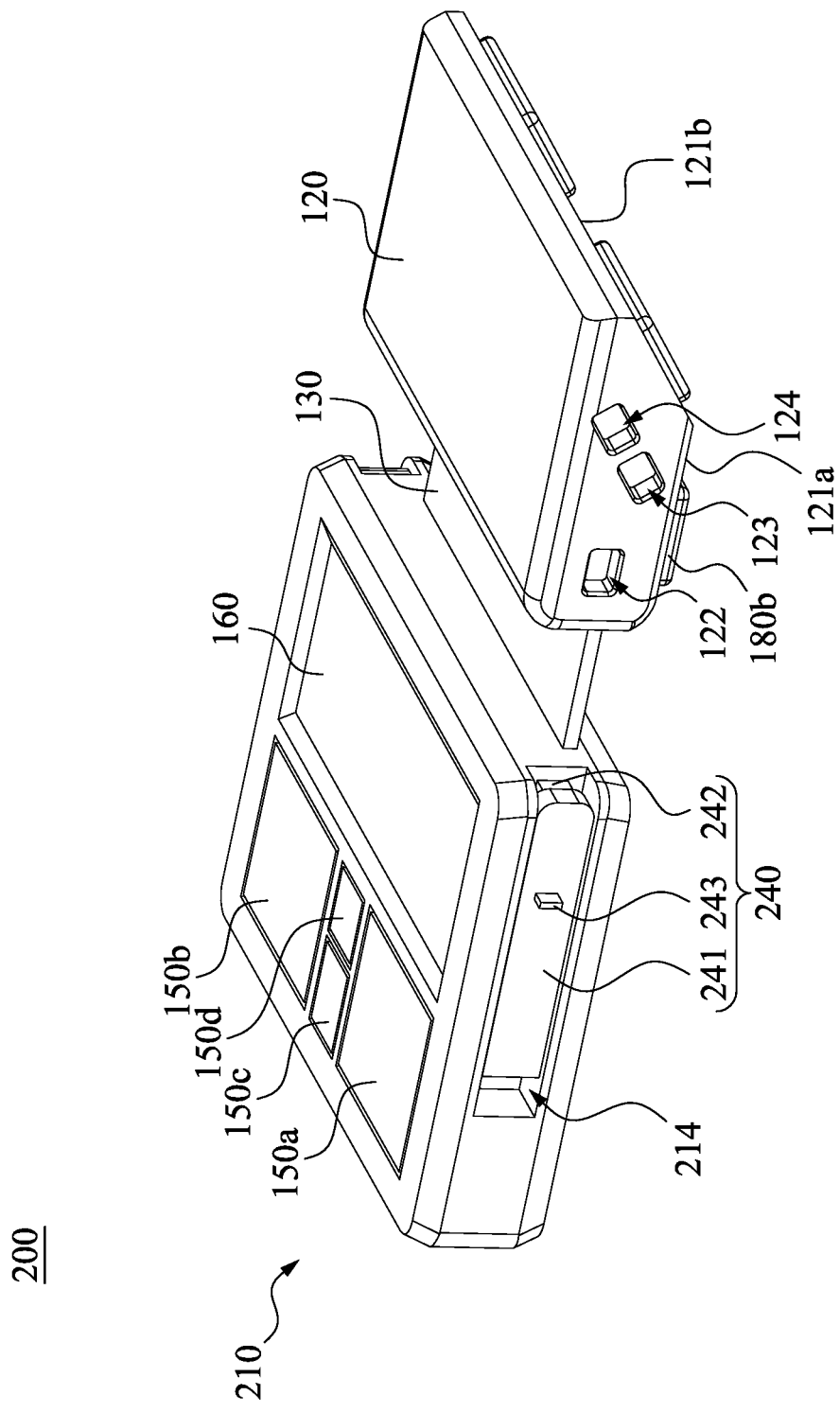
FIG. 6A is a perspective view of a mouse device according to another embodiment of the disclosure, in which a fixing member is folded to a first main body.
Figure 6B:
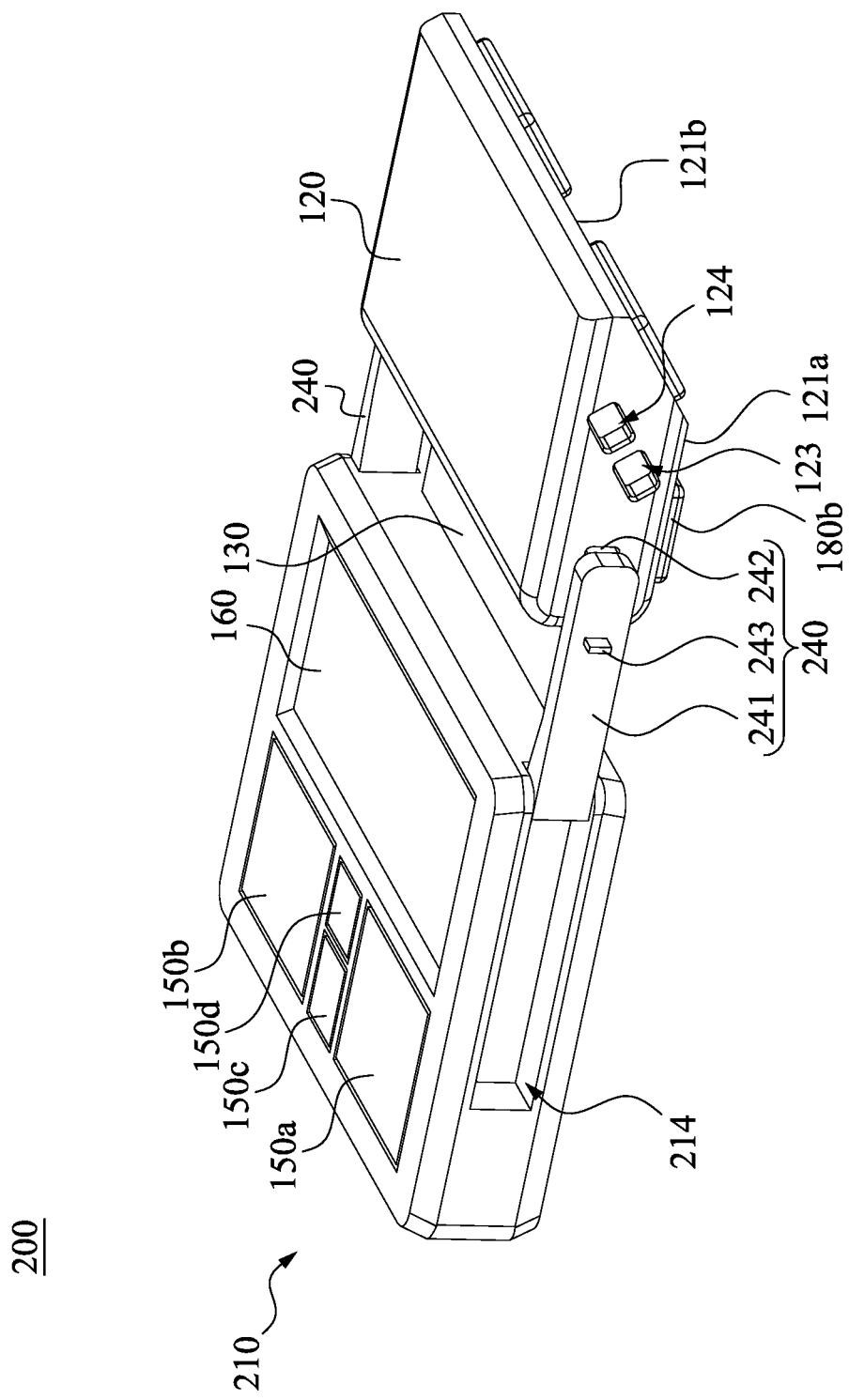
FIG. 6B is a perspective view of the mouse device according to another embodiment of the disclosure, in which the fixing member is fixed to the second main body to make the mouse device in the first operating state.

Reference is made to FIGS. 6A and 6B. FIG. 6A is a perspective view of a mouse device 200 according to another embodiment of the disclosure, in which a fixing member 240 is folded to a first main body 210. FIG. 6B is a perspective view of the mouse device 200 according to another embodiment of the disclosure, in which the fixing member 240 is fixed to the second main body 120 to make the mouse device 200 in the first operating state. It is noted that, in comparison with the embodiment shown in FIG. 1, a receiving groove 214 of the first main body 210 and the fixing member 240 are modified in the present embodiment. Therefore, other components adopting the same reference numbers may refer to the aforementioned related paragraphs and will not repeated here. Specifically, the fixing member 240 of the present embodiment is slidably connected to a sidewall of the receiving groove 214. Therefore, the fixing member 240 can be selectively received in the receiving groove 214 (as shown in FIG. 6A) or protruded outward (as shown in FIG. 6B) by sliding. The fixing member 240 includes an arm portion 241, a fixing block 242, and a push structure 243. When the fixing member 240 is received in the receiving groove 214, the fixing block 242 is located at a side of the arm portion 241 facing toward the first main body 210, and the push structure 243 is located at a side of the arm portion 241 away from the first main body 210. The push structure 243 is configured to be pushed by a finger of a user, so as to facilitate sliding the fixing member 240 relative to the receiving groove 214 of the first main body 210. The fixing block 242 is configured to be detachably engaged with one of the first fixing hole 122, the second fixing hole 123, and the third fixing hole 124 when the fixing member 240 protrudes, so that the mouse device 200 presents the operating states as shown in FIG. 3A, FIG. 3B, and FIG. 3C respectively.

In the present embodiment, the push structure 243 is in the form of a paddle, but the disclosure is not limited in this regard. In other embodiments, the push structure 243 can also be a plurality of groove structures.

Figure 7:
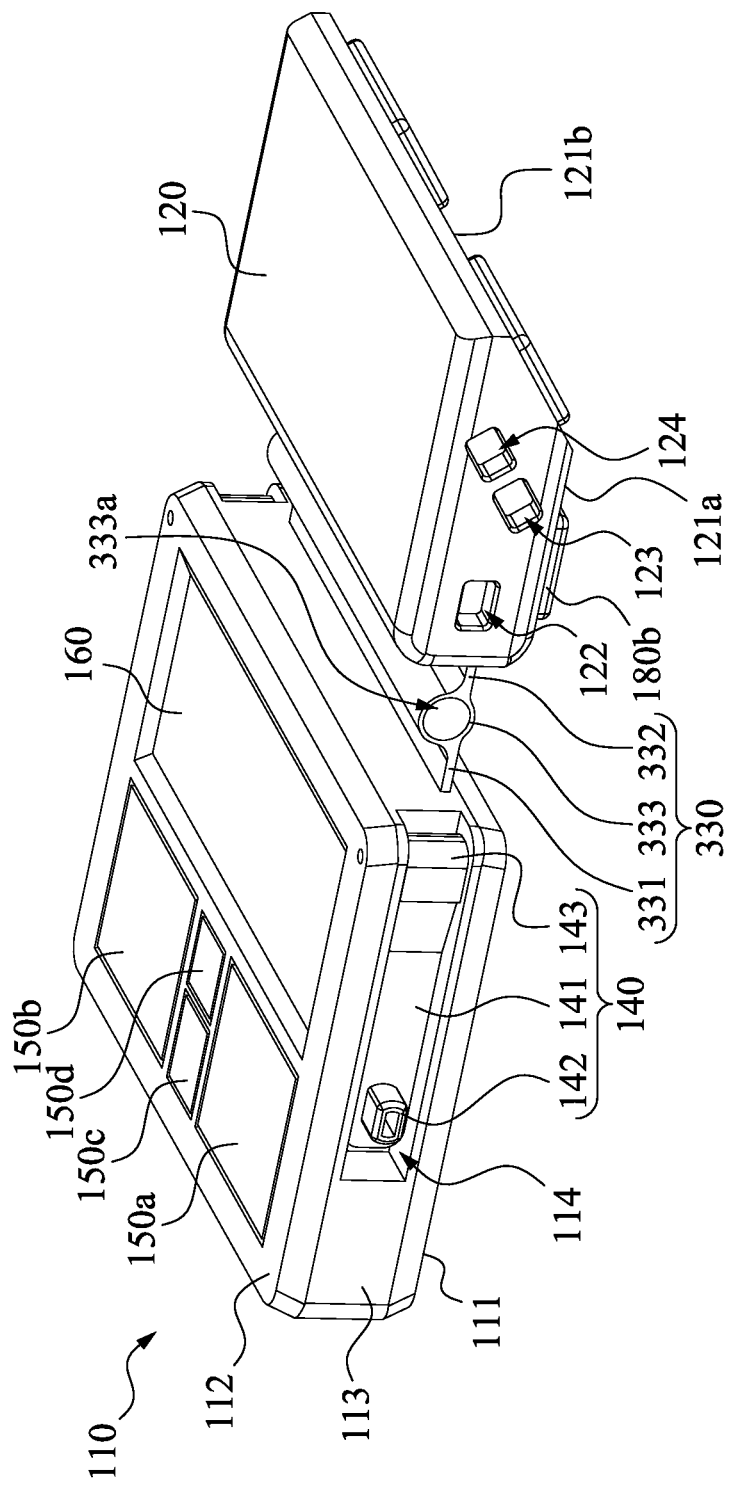
FIG. 7 is a perspective view of a mouse device according to another embodiment of the disclosure, in which the fixing member is folded to the first main body.

Reference is made to FIG. 7. FIG. 7 is a perspective view of a mouse device 300 according to another embodiment of the disclosure, in which the fixing member 140 is folded to the first main body 110. It is noted that, in comparison with the embodiment shown in FIG. 1, a flexible connecting member 330 is modified in the present embodiment. Therefore, other components adopting the same reference numbers may refer to the aforementioned related paragraphs and will not repeated here. Specifically, the flexible connecting member 330 of the present embodiment includes a first connecting portion 331, a second connecting portion 332, and a third connecting portion 333. The first connecting portion 331 is connected to the first main body 110. The second connecting portion 332 is connected to the second main body 120. The third connecting portion 333 is connected between the first connecting portion 331 and the second connecting portion 332 and has a receiving through hole 333a. The receiving through hole 333a may be used to receive an external object (e.g., a stylus).

In the present embodiment, the receiving through hole 333a extends to two ends of the flexible connecting member 330, but the disclosure is not limited in this regard. In other embodiments, the receiving through hole 333a may be opened only in a central region of the flexible connecting member 330.

According to the foregoing recitations of the embodiments of the disclosure, it can be seen that in the mouse device of the present disclosure, the two main bodies are connected through the flexible connecting member, so that the two main bodies can be folded close to each other by bending the flexible connecting member. Moreover, the two main bodies are respectively provided with the magnetic attracting members that can attract each other, thereby fixing the relative positions of the two main bodies. In other usage scenarios, the mouse device of the present disclosure can be used to attach the two main bodies to the front and back sides of an external electronic device (e.g., the external electronic device is designed with ferromagnetic materials or magnetic attracting members thereon), thereby improving the portability of the mouse device. In addition, in the mouse device of the present disclosure, the fixing member disposed on one of the main bodies can be selectively fixed to different fixing holes on the other of the main bodies, so that the two main bodies form different operating states and can be selected by different users according to their own operating experience.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mouse device, comprising:
a first main body having a first bottom surface;
a second main body having a second bottom surface, a first fixing hole, and a second fixing hole;
a flexible connecting member connected between the first main body and the second main body, wherein the first main body and the second main body are configured to be folded close to each other by bending the flexible connecting member; and
a fixing member disposed on the first main body and comprising a fixing block, the fixing block being configured to be detachably engaged with the first fixing hole, wherein the fixing block is further configured to be detachably engaged with the second fixing hole, and when the fixing block is engaged with the second fixing hole, the second bottom surface is inclined at an angle relative to the first bottom surface.

2. The mouse device of claim 1, wherein when the fixing block is engaged with the first fixing hole, the second bottom surface and the first bottom surface are substantially parallel to each other.

3. The mouse device of claim 1, wherein the second main body further has a third fixing hole, the fixing block is further configured to be detachably engaged with the third fixing hole, and when the fixing block is engaged with the third fixing hole, the second bottom surface is inclined at the angle relative to the first bottom surface.

4. The mouse device of claim 3, wherein shortest distances respectively measured from the second fixing hole and the third fixing hole to the second bottom surface are different.

5. The mouse device of claim 1, wherein the second main body further has a third bottom surface, and when the fixing block is engaged with the second fixing hole, the third bottom surface and the first bottom surface are substantially parallel to each other.

6. The mouse device of claim 5, wherein the second main body has a first height based on the second bottom surface and a second height based on the third bottom surface, and the first height is smaller than the second height.

7. The mouse device of claim 1, wherein the first main body has a receiving groove configured to receive the fixing member.

8. The mouse device of claim 7, wherein the fixing member is pivotally connected to a sidewall of the receiving groove.

9. The mouse device of claim 7, wherein the fixing member is slidably connected to a sidewall of the receiving groove.

10. The mouse device of claim 1, wherein the flexible connecting member comprises:
    a first connecting portion connected to the first main body;
    a second connecting portion connected to the second main body; and
    a third connecting portion connected between the first connecting portion and the second connecting portion and having a receiving through hole.

11. The mouse device of claim 1, further comprising:
    a first magnetic attracting member disposed on the first main body; and
    a second magnetic attracting member disposed on the second main body and configured to attract the first magnetic attracting member.

\* \* \* \* \*